Dec. 22, 1953   J. F. PIITZ   2,663,503
MEANS FOR EXTRICATING MOTOR VEHICLES FROM MUDHOLES
Filed May 5, 1952                                       2 Sheets-Sheet 1

INVENTOR:
JOHN F. PIITZ

Dec. 22, 1953     J. F. PIITZ     2,663,503
MEANS FOR EXTRICATING MOTOR VEHICLES FROM MUDHOLES
Filed May 5, 1952     2 Sheets-Sheet 2

INVENTOR:
JOHN F. PIITZ

Patented Dec. 22, 1953

2,663,503

UNITED STATES PATENT OFFICE 2,663,503

MEANS FOR EXTRICATING MOTOR VEHICLES FROM MUDHOLES

John Floyd Piitz, Wilmer, Ala.

Application May 5, 1952, Serial No. 286,098

6 Claims. (Cl. 238—14)

1

This invention relates to improvements in devices for extricating motor vehicles from mudholes, loose earth or the like and has for its primary object to provide a unit which may be positioned in close proximity to the mired wheel of a motor vehicle and serve as a firm support against which the wheel can grip sufficiently so that the rotation of the wheel will lift and propel the vehicle, enabling the vehicle to extricate itself under its own power.

Another object of the invention is to provide a simple and compact unit, which is portable and can be conveniently employed without the use of any tools and which will afford a firm support on which the mired wheel can ride upwardly to lift itself out of a hole.

Another object of this invention is to provide a device of the specified type, which is adjustable for use with any size wheel or with dual wheels and with any type vehicle, irrespective of size or weight.

A further object of this invention is to provide a pair of supports that are adapted to be disposed on opposite sides of a hole and slightly in front of a mired wheel, the supports being connected by chains that are adapted to be disposed under and in advance of the wheel so as to provide a traction surface and transfer the load to the supports and the supports having upstanding plates that grip against the side walls of the tire on the wheel and permit the supports to remain in ground engagement.

These and ancillary objects and structural features of merit are attained by this invention, the preferred embodiments of which are set forth in the following description and illustrated in the accompanying drawing wherein.

Referring now more particularly to the accompanying drawing and initially to Figures 1-4, the

2 vehicle extricating device 10 includes a pair of companion units 12 and 14, which are similarly constructed and which are connected in use by a pair of conventional chains 16 and 18. The length of the chains will of course vary depending upon the type of wheel or width of the tire. Thus, the device is adaptable for use on dual wheels or tractor tires by adjusting the length of the chains 16 and 18 in a manner to be described.

Figure 4:
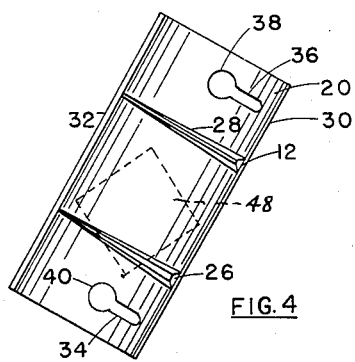
Figure 4 is a front elevational view of one unit of the device.

The unit 12 as seen more particularly in Figure 4 includes an elongated body section or rectangular plate 20, which is slightly curved about its longitudinal center line so as to have a front concave face 22 and a rear convex face 24 and the unit 10 is provided with an identical plate 20'.

The plate is formed on its concave face, inwardly from its opposing ends, with spaced transverse bosses or ribs 26 and 28. The bosses are integral with the plate and protrude from the concave face and are of somewhat triangular form, being tapered from the lower side edge 30 to the upper side edge 32.

To detachably connect the chains 16 and 18 to the plate in a manner so that the length of each chain can be varied, depending upon the type and size of wheel or tire, elongated slots 34 and 36 are formed transversely in the plate, adjacent its lower side edge 30. The upper ends of the slots are communicated with circular openings 38 and 40, through which the chain links can be passed. Thus, in attaching the chains 16 and 18 to the plate, one end of each chain is passed through the circular openings 38 and 40 and one of the links is then turned so it may be inserted in the slot 36, the preceding link, which is at right angles to the inserted link, abutting the convex face of the plate to prevent axial movement of the chains in the slots.

Figure 3:
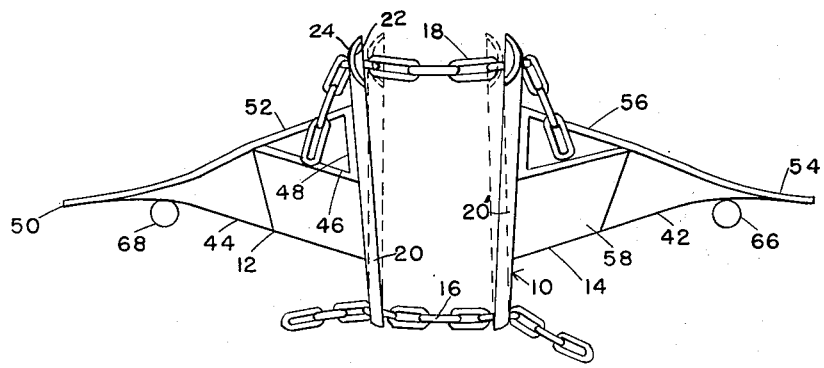
Figure 3 is a front perspective view of the extricating device, illustrating the same in position for use.

Identical supports 42 and 44 are provided for the plates 20 and 20' of each unit and, as seen in Figure 3, the support 44 is formed from an elongated section of sheet metal or the like material. One end of the support is bent back upon itself to form a triangular upstanding front end 46. The face 48 of the triangular front end is welded to the convex side of the plate in a canted position at an angle to the transverse axis of the plate, as seen in Figure 4. The supports 42 and 44 are secured in this fashion to the plates 20 and 20' adjacent one end of each of the plates. Thus, the face 46 of the triangular end 48 of the support 44 is secured to the plate 20 adjacent the slot 34 and at an angle to the transverse boss 26. The outer end 50 of the support is twisted axially so as to be offset from the side 52 of the triangular front end.

The outer end 54 of the support 42 is also twisted axially so as to be offset from the side 56 of the triangular front end 58.

Figure 1:
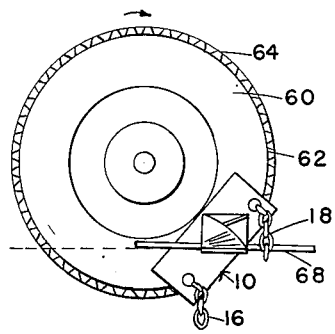
Figure 1 is a side elevational view of an automobile wheel, showing the extricating device in position for lifting the wheel from a hole.

The outer ends 50 and 54 of the support 42 and 44 are twisted or bent out of the plane of the sides 52 and 56, so that the ends can lie in proximity to the ground, as seen in Figure 1, while the upstanding front ends 46 and 58 support the plates 20 and 20' in an inclined position, as seen in Figure 1.

The faces 22 of the plates 20 and 20' are concaved to conform to the curvature of the juncture of the side walls 60 at tread portions 62 of a conventional pneumatic automobile tire. Therefore, upon the imposition of the pressure of the wheel upon the flexible transverse connecting elements or chains 16 and 18, the plates 20 and 20' are pulled toward each other and caused to clamp onto the tire 64, as seen in Figure 2, so that no slippage will occur between the tire and the extricating device 10, after the same are once brought into secure engagement with each other.

Figure 2:
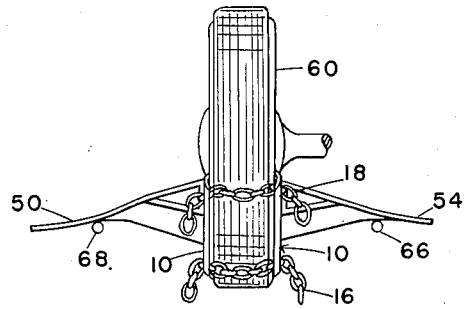
Figure 2 is a front elevational view of same.

In use, as seen in Figures 1 and 2, the extricating device 10, having been removed from the trunk of the mired vehicle, is positioned, so that the chain 16 is in close proximity to the lowest tread portion and the chain 18 is slightly in advance of the tire. The supports 42 and 44 extend laterally of the sides of the hole, within which the wheel is mired, the outer ends 50 and 54 being almost horizontal and almost in engagement with the ground surface. The plates 20 and 20' are supported in an inclined position.

The relation of the wheel to the extricating device is approximately as represented in Figure 1 and, upon the application of power to rotate the wheel, the wheel moves in the direction of the arrow in Figure 1 and the pressure of the wheel on the lower chain 16 and subsequently on the upper chain 18 causes the plates 20 and 20' to clamp onto the tire 64, as seen in Figure 2. The plates 20 and 20' press against the side walls 60 of the tire and create a clamping action or vise action against the tire to insure that no slippage will occur between the wheel and the extricating device 10.

The extricating device never actually leaves the position in which it is first placed, the forward movement of the wheel causing it to press downward into the hole and surrounding ground surface, as it lifts the wheel upward. As the wheel travels over the extricating device 10 and reaches the opposite side, the pressure against the chains 16 and 18 is released and the extricating device again assumes the position shown in full lines in Figure 3.

The bosses or ribs 26 and 28 are provided on the concave faces 22 of the plates 20 and 20' to more effectively increase the traction and prevent any slippage between the wheel and the extricating device.

In the event that the weight of the mired vehicle is so excessive, such as in the case of a loaded truck or the like, it is possible that the extricating device would be actually pushed down into the earth. To eliminate this possibility, supporting members 66 and 68, as seen in Figure 3, may be used. Such supporting members may be pieces of wood, planks, metal rods or anything which would support the outer ends of the supports 42 and 44. The supports 66 and 68 are inserted under the supports 42 and 44 at the inner ends of the offset outer ends 50 and 54 of the supports 42 and 44.

A series of extricating devices 10 may be used if desired, being attached together by chains, or the like, the proper distance one from the other to allow the mired wheel to enter the second extricating device just as it leaves the first, etc. However, one extricating device works efficiently, since it may be readily picked up and again placed in front of the wheel, in the event that the mired wheel is not completely extricated in its first engagement with the extricating device 10.

It will be noted that the plates 20 and 20' can be spaced further apart, for enabling the extricating device 10 to be used with dual wheels or a tractor wheel, and that such adjustment can be easily made by moving one end of each of the chains 16 and 18 into the circular openings 38 and 40 in one of the plates and sliding the plate outwardly to the desired distance from the other plate. Such adjustment may be effected, without the use of any tools and in a simple and convenient manner.

The extricating device 10 is a simple and compact unit and is easily stored in the trunk of a vehicle and removed and placed in position for use underneath the mired wheel of the vehicle within a few minutes of time and without the use of any tools or additional equipment. One person may easily extricate a mired vehicle by placing one of the extricating devices 10 in front of each or one of the rear driving wheels and then getting back into the vehicle and driving slowly forward until the extricating device 10 is released and the wheel has been lifted out of the hole.

Figure 5:
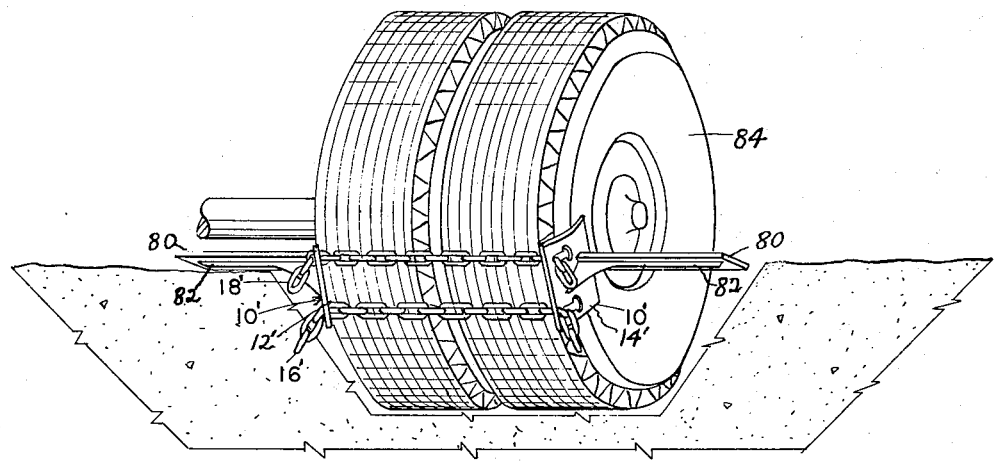
Figure 5 is a perspective view of a modified device, illustrating the same in use.
Figure 6:
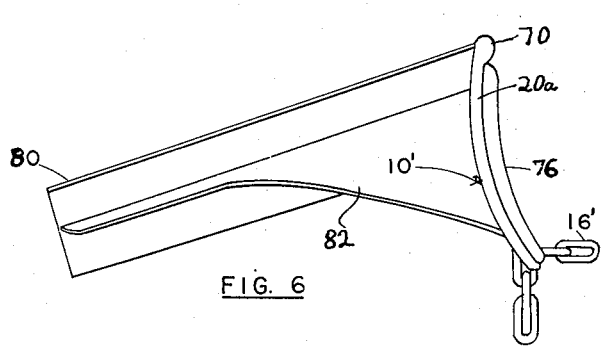
Figure 6 is a perspective bottom view of one unit of the device.
Figure 7:
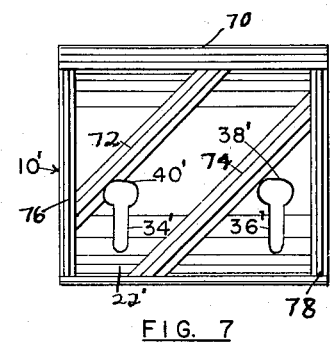
Figure 7 is a front elevational view thereof.
Figure 8:
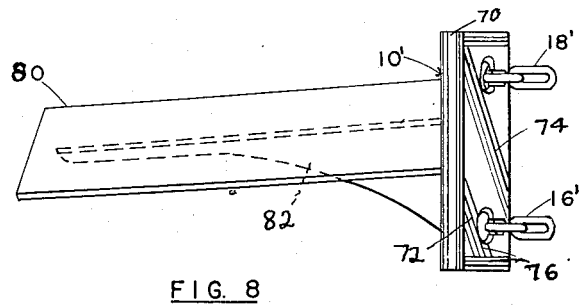
Figure 8 is a perspective top view thereof.

Referring to Figures 5–8, the device 10' includes companion units 12' and 14', which are identically constructed. As seen in Figures 6–8, the unit 12' includes a plate 20a which has a concave face 22'. At the upper edge of the face 22', a lip 70 is axially formed and diagonal bosses or ribs 72 and 74 are formed on the face with slender ribs 76 and 78 being formed on the side edges of the face. Slots 34' and 36' with communicating circular openings 38' and 40' are formed through the plate to receive chains 16' and 18'. A supporting plate 80 extends laterally from the convex face of the plate and is arranged at an angle or in a canted relation. The plate is formed on its underside with an axial reinforcing or rigidifying rib 82 that is attached to the convex face of the plate 20a and tapers outwardly.

In Figure 5, the device 10' is shown as applied for use to a dual wheel assembly 84, with the plates 20a of each unit clamped against the outer side walls of the walls at the tread portions and with the supporting plates 80 extending laterally from opposite sides of the hole and supporting the plates in inclined positions. The use and function of the device 10' is the same as the extricating device 10.

While I have disclosed the best known forms of this invention, it is obvious that various changes or modifications may be made and, therefore, I do not desire to be limited except in conformance with the appending claims.

Having thus described this invention, what is claimed is:

1. A device for assisting in extricating a mired vehicle wheel, comprising a pair of complemental plates, flexible members transversely connected in adjustable fashion to said plates to retain the plates in parallel side-by-side spaced relation, said plates being adapted to be disposed on opposite sides of a mired wheel and having concave confronting faces to clampingly engage the side walls of a tire on the wheel and means extending laterally from each plate to support the plates in positions inclined in the direction of movement of the wheel with the flexible members disposed under and in advance of the tread portions of the tire and adapted under the weight of the wheel to pull the plates into engagement with the side walls of the tire.

2. A device for assisting in extricating a mired vehicle wheel, comprising a pair of complemental plates disposed in spaced side-by-side relation, flexible members transversely connecting the plates, means for adjusting the length of said members between the plates to position the plates closer together or further apart, and means extending laterally from the plates for supporting the plates in inclined positions in advance of a mired wheel with said flexible members extending transversely of the tread portions of the wheel tire and adapted under pressure of the wheel to clamp the plates against the opposite side walls of the tire.

3. A device for assisting in extricating a mired vehicle wheel, comprising a pair of complemental plates disposed in spaced side-by-side relation, flexible members transversely connecting the plates, means for adjusting the length of said members between the plates to position the plates closer together or further apart, and means extending laterally from the plates for supporting the plates in inclined positions in advance of a mired wheel with said flexible members extending transversely of the tread portions of the wheel tire and adapted under pressure of the wheel to clamp the plates against the opposite side walls of the tire, said plates having inner longitudinally curved faces to engage the side walls of the tire at the tread portions.

4. A device for assisting in extricating a mired vehicle wheel, comprising a pair of complemental plates disposed in spaced side-by-side relation, flexible members transversely connecting the plates, means for adjusting the length of said members between the plates to position the plates closer together or further apart, and means extending laterally from the plates for supporting the plates in inclined positions in advance of a mired wheel with said flexible members extending transversely of the tread portions of the wheel tire and adapted under pressure of the wheel to clamp the plates against the opposite side walls of the tire, said plates having transverse slots to receive the flexible members and having enlarged openings communicating with one end of the slots and forming the adjusting means.

5. A device for assisting in extricating a mired vehicle wheel, comprising a pair of complemental plates disposed in spaced side-by-side relation, flexible members transversely connecting the plates, means for adjusting the length of said members between the plates to position the plates closer together or further apart, and means extending laterally from the plates for supporting the plates in inclined positions in advance of a mired wheel with said flexible members extending transversely of the tread portions of the wheel tire and adapted under pressure of the wheel to clamp the plates against the opposite side walls of the tire, said supporting means including elongated supports having upstanding inner reinforced ends affixed in canted position to the plates and having outer ends adapted to be in horizontal proximity to the ground on opposite sides of the mired wheel.

6. A device for assisting in extricating a mired vehicle wheel, comprising a pair of complemental plates disposed in spaced side-by-side relation, flexible members transversely connecting the plates, means for adjusting the length of said members between the plates to position the plates closer together or further apart, and means extending laterally from the plates for supporting the plates in inclined positions in advance of a mired wheel with said flexible members extending transversely of the tread portions of the wheel tire and adapted under pressure of the wheel to clamp the plates against the opposite side walls of the tire, said plates having inner longitudinally curved faces to engage the side walls of the tire at the tread portions, and reinforcing means formed transversely on the inner faces.

JOHN FLOYD PITTZ.

No references cited.